US009319537B2

(12) United States Patent
Peker et al.

(10) Patent No.: US 9,319,537 B2
(45) Date of Patent: Apr. 19, 2016

(54) LOAD BALANCING REVERSE POWER SUPPLY

(71) Applicant: Microsemi Corporation, Aliso Viejo, CA (US)

(72) Inventors: Arkadiy Peker, Glen Cove, NY (US); Daniel Feldman, San Jose, CA (US); Shahar Feldman, Irvine, CA (US); Roni Blaut, Kfar Horeah (IL)

(73) Assignee: Microsemi Corporation, Aliso Viejo, CA (US)

(*) Notice: Subject to any disclaimer, the term of this patent is extended or adjusted under 35 U.S.C. 154(b) by 0 days.

(21) Appl. No.: 14/691,132

(22) Filed: Apr. 20, 2015

(65) Prior Publication Data

US 2015/0304508 A1 Oct. 22, 2015

Related U.S. Application Data

(60) Provisional application No. 61/982,566, filed on Apr. 22, 2014.

(51) Int. Cl.
*H04M 1/00* (2006.01)
*H04M 9/00* (2006.01)
(Continued)

(52) U.S. Cl.
CPC ............. *H04M 19/003* (2013.01); *H04L 12/10* (2013.01); *H04L 12/2885* (2013.01); *H04L 12/2898* (2013.01); *H04L 12/40045* (2013.01); *H04L 41/0833* (2013.01); *H04M 3/2209* (2013.01);

(Continued)

(58) Field of Classification Search
CPC .............. H04L 12/10; H04L 12/40045; H04L 12/2885; H04M 19/008; H04M 19/003; H04M 3/2209; H04B 10/27; H04B 10/808
USPC .......... 379/1.01, 1.03, 1.04, 24, 26.01, 29.03, 379/29.04, 413; 398/66, 72, 171
See application file for complete search history.

(56) References Cited

U.S. PATENT DOCUMENTS 6,992,404 B2 * 1/2006 Priest .................... H04M 19/08 307/52
7,259,474 B2 * 8/2007 Blanc ........................ H02J 1/10 307/19

(Continued)

FOREIGN PATENT DOCUMENTS

EP 2120443 A1 11/2009

OTHER PUBLICATIONS

"Access, Terminals, Transmission and Multiplexing (ATTM): Reverse Power Feed for Remote Nodes", ETSI TR 629 V2.1.2, Mar. 1, 2011, 24 pages.

(Continued)

*Primary Examiner* — Binh Tieu
(74) *Attorney, Agent, or Firm* — Amerson Law Firm, PLLC

(57) ABSTRACT

A power supply unit includes a plurality of the interface ports and a plurality of power delivery units, each coupled to one of the interface ports and configured to extract power from data signals communicated over the interface ports by remote devices. A sharing circuit is coupled to each of the power delivery units for generating a power supply voltage from the power extracted from the data signals. A controller is configured to generate a communication line power loss estimate for each of the interface ports and configure the power delivery units to balance amounts of power supplied by each of the remote devices based on the communication line power loss estimates.

38 Claims, 7 Drawing Sheets

DISTRIBUTION POINT
105
MAIN DISTRIBUTION UNIT
POWER SUPPLY
100
DATA
DATA + POWER
135
132
CPE 1 110
115
140
150
POWER
POWER SHARING CIRCUIT 145
PD1 130
CPE 2 110
FIBER
CONTROLLER 155
PD2 130
CPE N 110
PDN 130
125
120

(51) Int. Cl.

| | |
|---|---|
| ***H04M 1/24*** | (2006.01) |
| ***H04M 3/08*** | (2006.01) |
| ***H04M 3/22*** | (2006.01) |
| ***H04M 19/00*** | (2006.01) |
| ***H04L 12/40*** | (2006.01) |
| ***H04L 12/10*** | (2006.01) |
| ***H04L 12/28*** | (2006.01) |
| ***H04M 19/08*** | (2006.01) |
| ***H04Q 11/00*** | (2006.01) |
| ***H04L 12/24*** | (2006.01) |

(52) U.S. Cl.
CPC ........... *H04M 19/08* (2013.01); *H04Q 11/0067* (2013.01); *H04Q 2011/0079* (2013.01)

(56) References Cited

U.S. PATENT DOCUMENTS

| | | | | |
|---|---|---|---|---|
| 7,359,647 | B1 * | 4/2008 | Faria | H02J 17/00 398/113 |
| 7,580,732 | B2 * | 8/2009 | Bailey | H04M 1/738 370/216 |
| 7,923,855 | B2 * | 4/2011 | Biegert | H04B 3/542 307/1 |
| 8,212,375 | B2 * | 7/2012 | Paulsen | H02J 7/0042 307/1 |
| 8,338,981 | B2 * | 12/2012 | Biegert | H04B 3/542 307/1 |
| 8,601,289 | B1 | 12/2013 | Smith et al. | |
| 8,963,367 | B2 * | 2/2015 | Melamed | H04L 12/10 307/18 |
| 2006/0061928 | A1 * | 3/2006 | Priest | H04M 19/08 361/90 |
| 2007/0003053 | A1 * | 1/2007 | Mathoorasing | H04M 19/008 379/413 |
| 2011/0064212 | A1 * | 3/2011 | Cooper | H04M 19/08 379/307 |
| 2013/0169042 | A1 * | 7/2013 | Melamed | H04L 12/10 307/18 |
| 2014/0172133 | A1 * | 6/2014 | Snyder | H04L 12/2818 700/90 |
| 2015/0304508 | A1 * | 10/2015 | Peker | H04M 19/003 379/24 |

OTHER PUBLICATIONS

International Search Report and Written Opinion corresponding to PCT/US2015/026663 mailed Jul. 21, 2015, 13 pages.

Per Karlsson et al., “DC Bus Voltage Control for a Distributed Power System”, IEEE Transactions on Power Electronics, vol. 18, No. 6, Nov. 2003, 8 pages.

* cited by examiner

LOAD BALANCING REVERSE POWER SUPPLY

CROSS REFERENCE TO RELATED APPLICATIONS

This application claims priority to the U.S. Provisional Patent Application 61/982,566, filed on Apr. 22, 2014, the entirety of which is incorporated herein by reference.

BACKGROUND

1. Field of the Disclosure

The present disclosure relates generally to communication systems, and more particularly to a load balancing reverse power supply that estimates communication line power losses.

2. Description of the Related Art

Various communication standards, such as digital subscriber line (xDSL), very-high-bit-rate digital subscriber line 2 (VDSL2), G.hn, and G.fast, have been proposed or developed to provide high-speed data transmission from the service provider (e.g., a central office) to a customer premise over the existing twisted-pair copper wiring conventionally used for telephone service. Such technologies leverage modem technology to increase the data transfer bandwidth of the twisted-pair copper wiring. Typically, modems are provided on the ends of the subscriber line copper wiring to communicate between the central office and the customer premise. The manner in which the two modems communicate is established by the particular standard governing the communication. Because the existing telephone wire is used, the data signals are typically transferred out-of band with the voice band signals. Because different frequencies are used for the voice band and the data band, voice and data information can be concurrently transferred over the twisted-pair copper line.

Service providers have increased data bandwidth by installing fiber optic cabling between the central office and a distribution point (DP) closer to the customers. A particular DP may interface with a bundle of twisted pairs to service a relatively small number of customer premise connections. This approach shortens the length of the copper pair between the CO interface at the DP and the customer, thereby allowing increased data rates.

One difficulty arising from an optical connection between the central office and the DP lies in the ability to provide a source of power for the DP. Due to the remoteness of the DP with respect to the central office, a local power supply is often unavailable or expensive to install. Power over Ethernet (PoE) devices have been developed, which in general terms, provide for power sourcing equipment (PSE) which is arranged to detect, optionally classify, and ultimately, provide power over data communication cabling to a powered device (PD) without interfering with data communication. PoE may be adapted to allow the customer premise equipment (CPE) to use its local power supply to act as a PSE so as to generate a DC voltage that may be superimposed with the data and voice signals being communicated over the twisted pair connection to allow the DP to extract power for its own use as a PD. A power supply in the DP combines power contributions from multiple CPE units to power a main distribution unit (MDU) that handles the voice and data communication. This arrangement is referred to as a reverse power system, where the CPEs are the power sourcing equipment (PSE) and the DP is the PD.

The power supply may attempt to balance the power delivered by the CPE units, so that each CPE is delivering an equal amount of power. However, since the length of the twisted pair connection between the DP and the various CPEs may differ, balancing the power just based on power delivered by PDs may not be "fair", as CPEs with longer communication lines may then actually output more total power than those with shorter communication lines due to communication line power losses.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
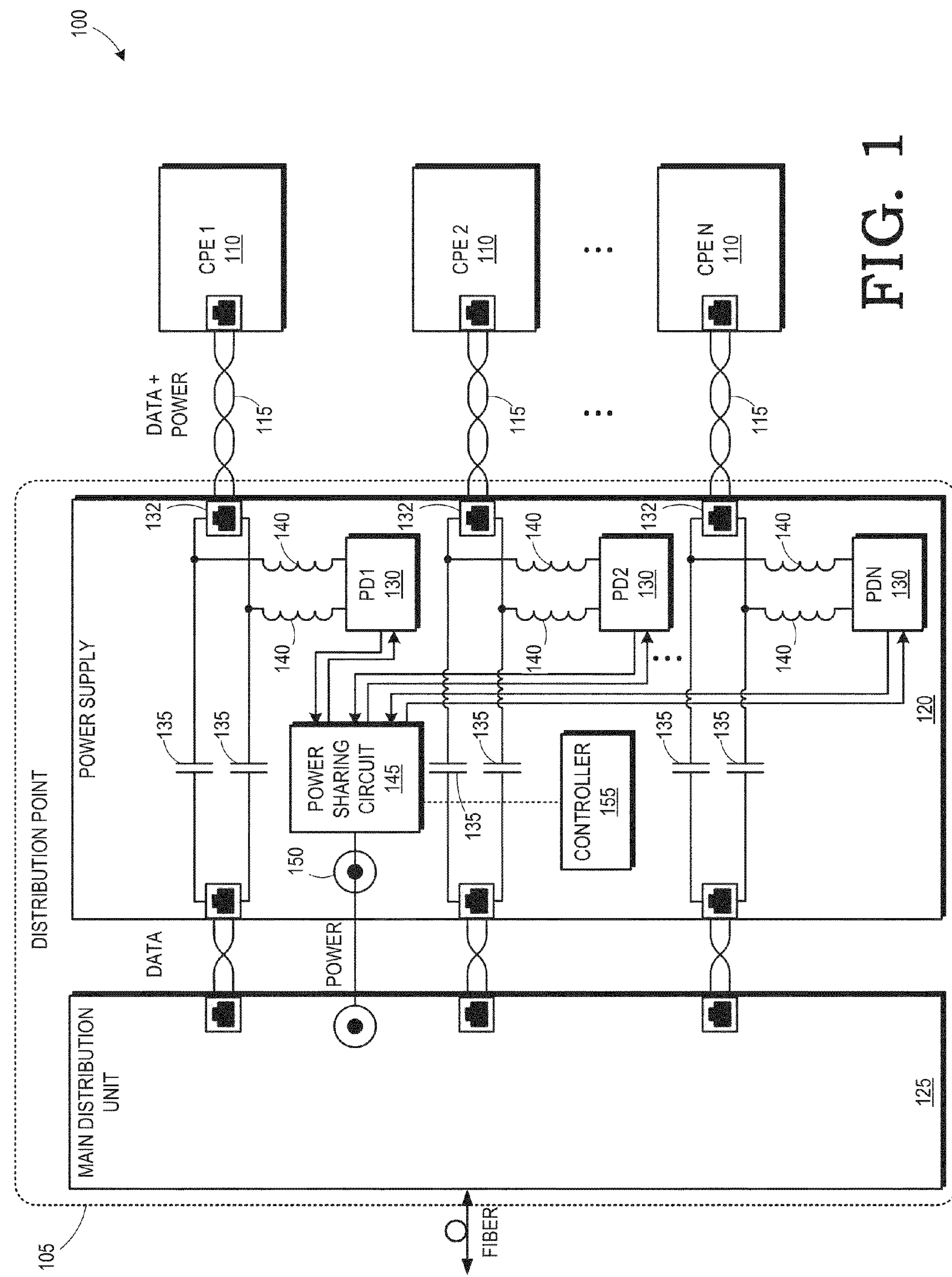
FIG. 1 is a diagram of a communications system in accordance with some embodiments.

FIG. 1 is a diagram of a communications system 100 in accordance with some embodiments. The communications system 100 includes a distribution point (DP) 105 for servicing a plurality of customer premise equipment (CPE) 110 via respective communication lines 115. The DP 105 provides data and/or voice services to the CPEs 110. Some of the CPEs 110 may be capable of sourcing power for the distribution point 105. For example, a power sourcing CPE 110 may include a switching power converter to generate a DC voltage on its associated communication line 115. The DP 105 includes a power supply 120 and a main distribution unit (MDU) 125. The power supply 120 extracts power from the DC signals on the communication lines 115 to generate a power source for the MDU 125. The MDU 125 handles the voice and data functionalities depending on the particular service protocol being employed.

The power supply 120 includes a plurality of power delivery (PD) units 130, one for each interface port 132 coupled to a communication line 115. Blocking capacitors 135 for each interface port 132 allow high frequency data signals to pass to the MDU 125, but block the DC power supply signals. Blocking inductors 140 allow the DC signals to pass to the PD units 130, but block the high frequency data signals. The outputs of the PD units 130 are provided to a power sharing circuit 145 for generating a power source 150 for the MDU 125. A controller 155 interfaces with the power sharing circuit 145 for balancing the power across the CPEs 110 and generates control signals for controlling the PD units 130. The control signals may be reference voltages to implement current based power sharing or enable signals to implement time based power sharing. The controller 155 estimates the power losses across the communication lines 115 and combines the losses with the actual power delivered to the MDU 125 so that the total power output by the various CPEs 110 can be balanced. The power balancing is intended to represent controlling the PD unit 130 so that the total power output by the CPEs 110 is substantially equal. Because the resistance estimates may include assumed parameter values or simplifying assumptions, and due to control variation, the actual powers may not be exactly equal. In some embodiments, the term "substantially equal" may be less than around 5%.

Figure 2:
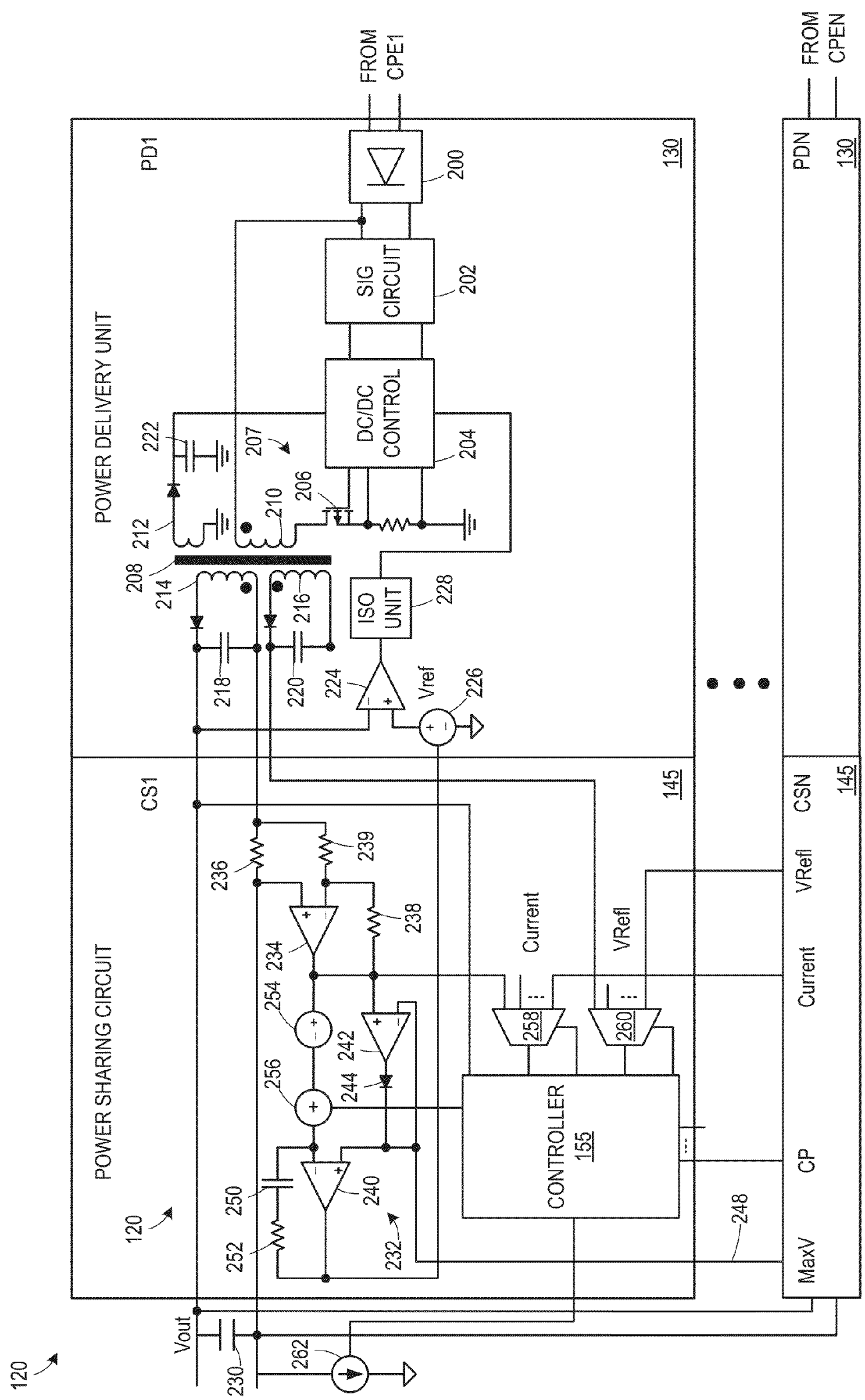
FIG. 2 is a diagram of the power supply of FIG. 1 illustrating the power sharing circuit and exemplary PD units in accordance with some embodiments.

FIG. 2 is a diagram of the power supply 120 illustrating the power sharing circuit 145 and exemplary PD units 130 in accordance with some embodiments. A diode bridge 200 is coupled to the interface port 132 coupled to the communication line 115 (shown in FIG. 1). A signature circuit 202 enables the PSE in CPE 110 to identify the presence of a valid PD on the communication line 115, and in response the PSE in the CPE 110 imposes a DC voltage on the communication line 115 that can be used by the power supply 120 to reverse power the MDU 125. The signature circuit 202 may be active or passive. A DC/DC control unit 204 controls a switching transistor 206 to implement a switching converter circuit 207 that generates a DC voltage from the power source provided by the CPE 110. The magnitude of the DC voltage generated by the power delivery unit 130 may differ from that generated by the attached CPE 110, or the voltages may be the same, without exceeding the scope of the present subject matter.

The DC/DC control unit 204 employs a transformer 208 as an energy storage element and also to provide isolation. The isolation transformer 208 includes a primary winding 210 and a bias winding 212 on the primary side, and a load winding 214 and a primary reflected winding 216 on the secondary side. Capacitors 218, 220 generate voltages corresponding to the currents passing through the load winding 218 and the primary reflected winding 216, respectively. The bias winding 212 generates a bias voltage at a capacitor 222 to provide a bias for the DC/DC control unit 204. A comparator 224 compares the output voltage generated by the load winding 214 at the capacitor 218 to a reference voltage source 226, as described in greater detail below. An isolation unit 228, such as an optical isolation unit, provides isolation between the PD unit 130 and the power sharing circuit 145. The combined outputs of the power delivery units 130 generate a voltage on an output capacitor 230 that provides the power supply voltage for the MDU 125 (shown in FIG. 1). The construct and operation of the DC/DC control unit 204 to generate power is known to those of ordinary skill in the art, so they are not described in detail herein.

The power sharing circuit 145 includes a control loop 232 that is replicated for each associated PD unit 130. The control loop 232 includes a current sensing amplifier 234 that generates an output proportional to a voltage drop across a current sensing resistor 236 having a resistance value of Rcs. The gain of the current sensing amplifier 234, Gcsa, is determined by the ratio of the resistance of a resistor 238 in the feedback path to the resistance of a resistor 239 coupled to the subtractive input of the current sensing amplifier 234. The voltage generated by the current sensing amplifier 234 represents the current generated by the power delivery unit 130 on the secondary side of the transformer 208.

The control loop 232 includes an error amplifier 240. The output of the current sensing amplifier 234 provides the input to a non-inverting input of an amplifier 242. The output of the amplifier 242 is fed back to its inverting input such that the amplifier 242 and diode 244 act as an ideal diode. The output of the diode 244 also feeds a reference bus 248. Due to the ideal diodes in each control loop 232, the voltage on the reference bus 248 is the most positive voltage from all of the control loops 232, which represents the current being output by the PD unit 130 generating the most current. The error amplifier 240 compares the output of the current sensing amplifier 234 to the voltage on the reference bus 248. The current sensing amplifier 234 and the error amplifier 240 in conjunction with a capacitor 250 and a resistor 252 in its feedback path act as a proportional-integral (PI) controller to reduce the error signal by adjusting the reference voltage 226, as will be further described. If the associated PD unit 130 is not the PD unit 130 generating the most current, a positive error signal is present. The error amplifier 240 drives the reference voltage source 226 for the DC/DC control unit 204 in the PD unit 130. A positive error signal increases the value output by reference voltage source 226, thereby causing the PD unit 130 to provide more current by increasing its output voltage. An offset voltage source 254 in the forward path of the control loop 232 generates a small offset to provide loop stability. At steady state, the control loops 232 balance the currents generated across all of the PD units 130.

Balancing the PD units 130 based on the measured current generated at the load winding 218 only balances current delivered to the power sharing circuit 145, not the total power generated by the CPEs 110, because communication line power losses may differ for each CPE 110. To balance total power generated, the controller 155 estimates line losses for each CPE 110 and generates a control parameter, CP, to configure a power offset voltage source 256 in the forward path of the control loop 232. Increasing the control parameter makes it appear that the PD unit 130 is generating more current than is actually being generated, thereby providing a correction factor for the PD unit 130 to account for the communication line losses. CPEs 110 providing power over communication lines 115 having relatively higher line losses will have increased correction factors as compared to CPEs 110 with lower line losses.

To estimate communication line power losses, the controller 155 employs a calibration procedure to estimate the resistance of each communication line 115. This resistance may then be used to calculate a line loss during operation of the communications system 100. The power sharing circuit 145 includes multiplexers 258, 260 to allow the controller 155 to read the control voltage generated by the current sensing amplifier 234 representative of the output current of the PD unit 130 and to read the voltage generated by the primary reflected winding 216 representative of the PD unit 130 output voltage, respectively. The controller 155 also receives the power supply output voltage on the capacitor 230.

Figure 3:
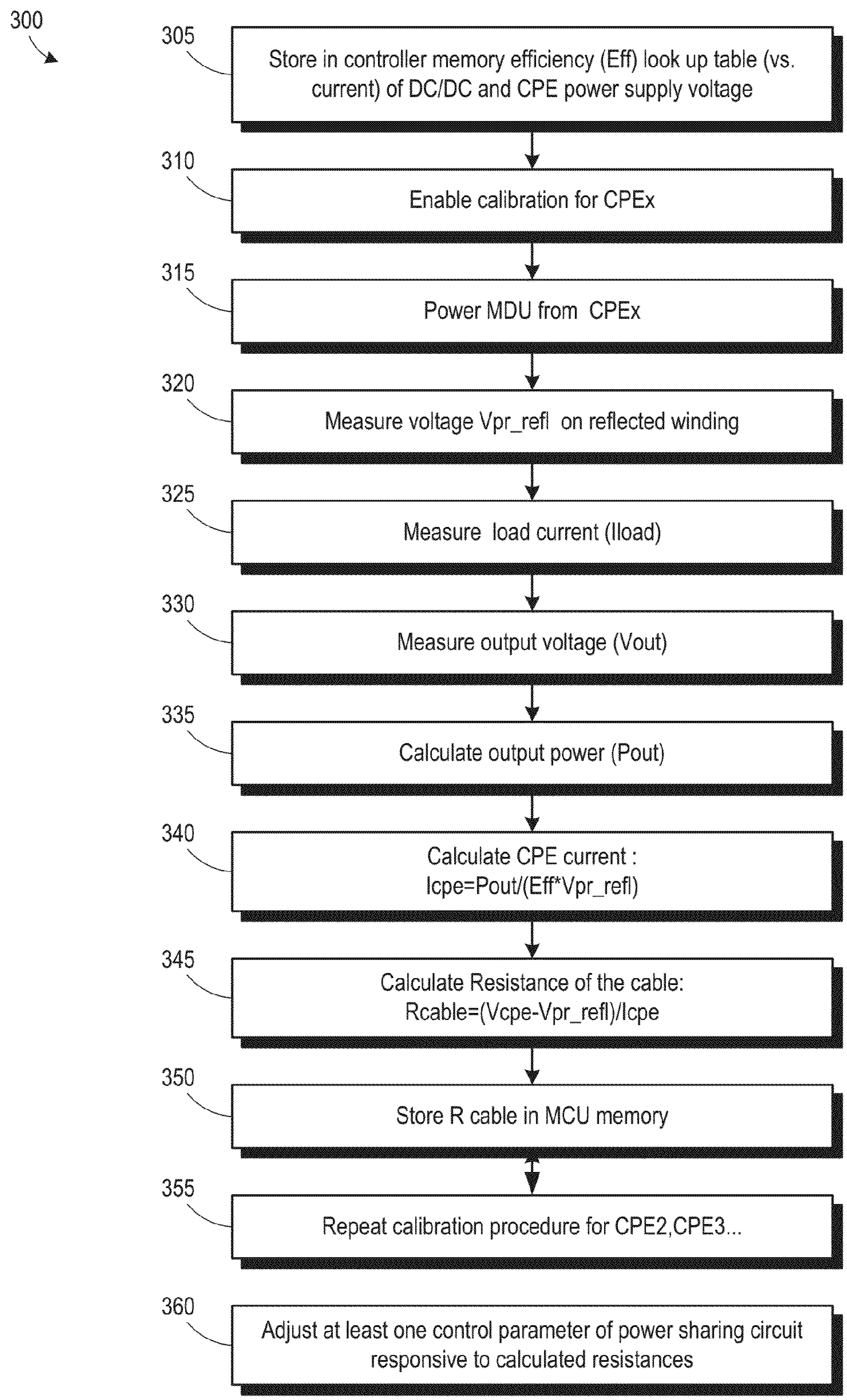
FIG. 3 is a flow diagram of a method for estimating the resistances of the communication lines in accordance with some embodiments.

FIG. 3 is a flow diagram of a method 300 for estimating the resistances of the communication lines 115 in accordance with some embodiments. In a first embodiment, the controller 155 uses the primary reflected voltage and the measured PD unit current to estimate the line resistance. In method block 305, an efficiency look-up table is stored in the controller 155 memory. The efficiency table outputs an efficiency parameter, Eff, as a function of the measured current. The efficiency factor takes into consideration the losses associated with the transformer 208 that vary with current. In method block 310, the calibration for a selected CPE 110 (CPEx) is enabled. As illustrated by method block 315, in one embodiment, the MDU 125 may serve as the load for the selected CPE 110. In another embodiment described below, a current source 262 may be selectively enabled to act as a load during the calibration.

In method block 320, the controller 155 configures the multiplexer 260 to measure the primary reflected voltage, Vpr_refl for the selected CPE 110, which is representative of the CPE voltage on the primary side. Measuring Vpr-refl under a no load condition closely represents the CPE voltage less the voltage over the diode bridge 200. In method block 325, the controller 155 configures the multiplexer 258 to measure the load current, Iload (i.e., the current output by the selected CPE as measured across the resistor 236. In method block 330 the controller measures the output voltage, Vout, on the capacitor 230. Based on the output voltage and the load current, the controller 155 calculates the output power, Pout, in method block 335 using the equation:

$$Pout=Vout*Iload.$$

The controller 155 calculates the current of the selected CPE 110 in method block 340 using the equation:

$$Icpe=Pout/(Eff*Vpr\_refl).$$

In some embodiments, the operating characteristics of the CPE 110 are known by the controller 155, so the voltage of the CPE 110, Vcpe, has a predetermined value. As described below, in other embodiments, the value of Vcpe may be measured, either automatically by the selected CPE 110, by the power supply 120, or by authorized personnel. In method block 345, the controller 155 determines the resistance of the communication line 115 for the selected CPE 110 using the equation:

$$Rcable=(Vcpe-Vpr\_refl)/Icpe.$$

In method block 350, the calculated resistance is stored in the controller memory and the calibration is repeated for each of the remaining CPEs 110 in method block 355. In some embodiments, the controller initiates the calibration procedure upon power-up or when a new CPE 110 becomes available. The controller 155 may repeat the calibration at a predetermined frequency, such as hourly, daily, weekly, without limitation. A non-volatile memory may be used to store the estimated resistances should the distribution point 105 lose power. In method block 360, at least one control parameter of the power sharing circuit 145 is adjusted responsive to calculated resistances to balance total power output by the various CPEs 110.

In another embodiment, the CPEs 110 may be configured to measure their own voltage and current parameters and communicate them over the communication line 115. The protocol being used for the data traffic would define a command or transaction to communicate the measured parameters. In such a case, the controller 155 would extract these values from the data stream and use them for calibrating the estimated line resistance. In the context of FIG. 3, the values of Icpe would be known, so method block 340 would be omitted. The estimated resistance would be calculated as shown in method block 345.

Figure 4:
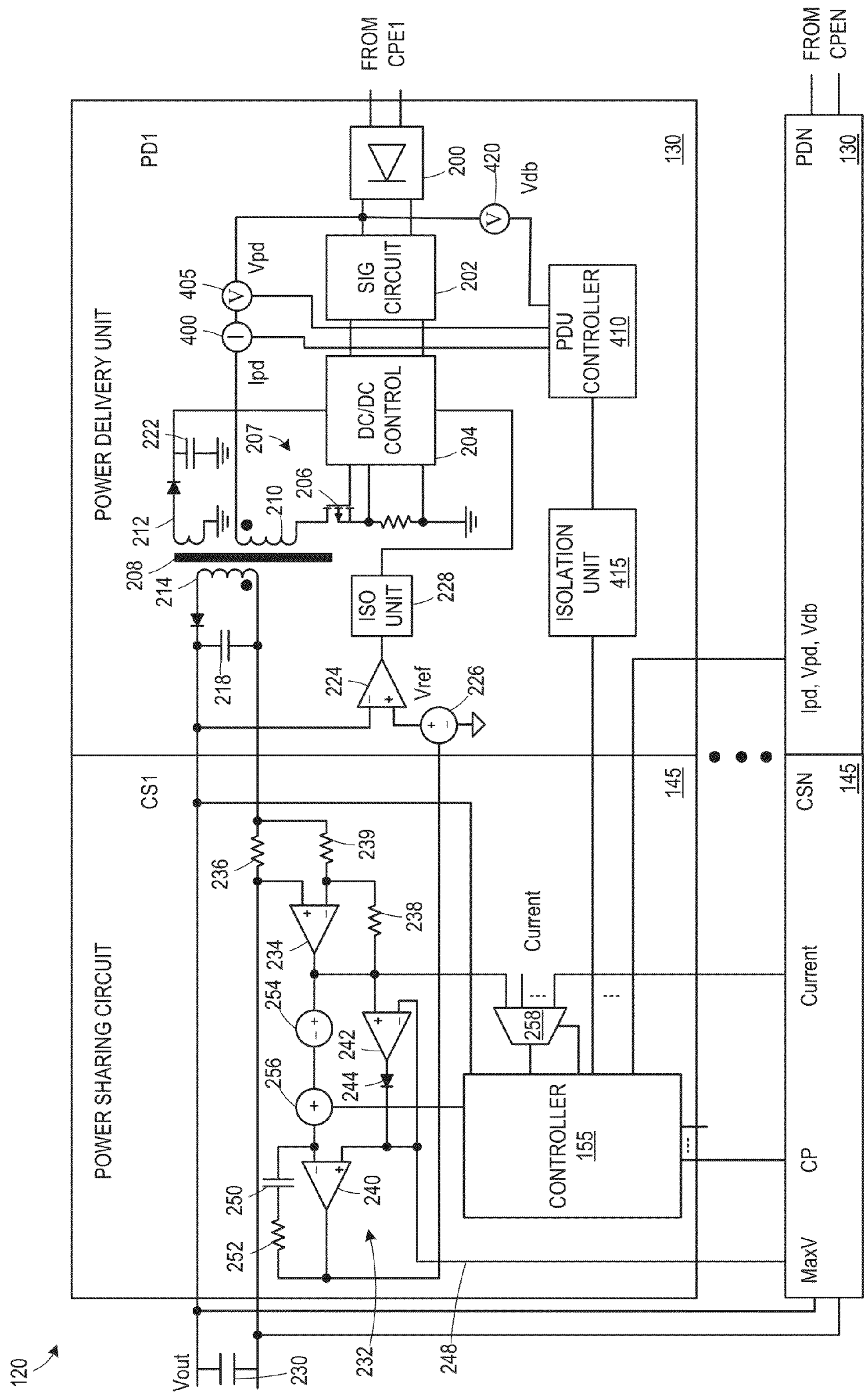
FIG. 4 is a diagram of the power supply illustrating the power sharing circuit and exemplary PD units where the voltage and current are measured on the primary side of the transformer in accordance with some embodiments.

FIG. 4 is a diagram of the power supply 120 illustrating the power sharing circuit 145 and exemplary PD units 130 where the voltage and current are measured on the primary side of the transformer 208 in accordance with some embodiments. Each PD unit 130 includes a current sensor 400 and a voltage sensor 405. A power delivery unit (PDU) controller 410 communicates the measured power and current parameters, Vpd, Ipd, to the controller 155 in the power sharing circuit 145 through an isolation unit 415, which may be an optical isolation unit. Note that in the embodiment of FIG. 4, a primary reflected winding is not required in the transformer 208. In the context of FIG. 3, the voltage of the CPE 110, Vcpe, may be assumed to be a known value, or alternatively, Vcpe may be measured under a no load condition and calculated based on the measured value of Vpd plus the voltage drop over the diode bridge, Vdb as:

$$Vcpe=Vpd+Vdb.$$

The value of Vdb may be assumed to be a constant value or may be generated using a look-up table as a function of current. The resistance of the communication line 115 is calculated in method block 345 using the equation:

$$R=(Vcpe-Vpd-Vdb)/Icpe.$$

Based on the determined communication line resistance values, the controller 155 determines correction factors to apply to the power offset voltage source 256 in the forward path of the control loop 232 so that the total power delivered by each CPE 110 may be balanced as described above in reference to method block 350.

Consider a case where two CPEs 110 are providing power to the power supply 120. For the following example, the communication line power loss for a given CPE 110 is represented by Pcln, and the power delivered by the associated PD unit 130 is represented by Pdpn. For the two CPE case:

$$Pcpe1=Pdp1+Pcl1$$

$$Pcpe2=Pdp2+Pcl2$$

$$Pload=Pdp1+Pdp2$$

$$Pdp2=Pload-Pdp1.$$

To balance the total power output by the CPEs 110, the goal is:

$$Pcpe1=Pcpe2.$$

Therefore:

$$Pdp1+Pcl1=Pdp2+Pcl2$$

$$Pdp1=Pdp2+Pcl2-Pcl1$$

$$Pdp1=Pload-Pdp1+Pcl2-Pcl1$$

$$Pdp1=Pcl2/2-Pcl1/2+Pload/2$$

$$Pdp2=Pload-(Pcl2/2-Pcl1/2+Pload/2)=Pcl1/2-Pcl2/2+Pload/2$$

The general case for n channels is:

$$Pdpn=\frac{Pload}{N}+\frac{1}{N}\times\sum_{m=1}^{N}Pclm-Pcln,$$

where m is an index used in the summation to determine the total power cable loss.

Dividing by Vout to transfer to a current equation yields the current for each channel, Idn:

$$Idn=\frac{\sum_{m=1}^{N}Iloadm}{N}+\left(\frac{\frac{1}{N}\cdot\sum_{m=1}^{N}Pclm-Pcln}{Vout}\right),$$

where Iloadm represents the load current for each channel, which is summed to determine total current across the N channels.

When considering the loss across the diode bridge 200, the terms can be defined as:

$$Pclm = \frac{(Vcpe - Vpd - Vdb)^2}{Rchm} + Vdb\frac{(Vcpe - Vpd - Vdb)}{Rchm},$$

$$Pcln = \frac{(Vcpe - Vpd - Vdb)^2}{Rchn} + Vdb\frac{(Vcpe - Vpd - Vdb)}{Rchn},$$

where Rch represents the determined resistance of the communication line 115 designated by the index m or n.

The value for Vpd could be directly measured as illustrated in FIG. 4, or it may be determined based on the value Vpr_refl on the primary reflected winding as illustrated in FIG. 2. In some embodiments, from this general current equation, the control parameter for the control loop 232, denoted CPn, may be defined as:

$$CPn = \left(\frac{\left(\frac{1}{N}\cdot\sum_{m=1}^{N} Pclm\right) - Pcln}{Vout}\right),$$

where CPn represents a voltage offset. The controller 155 uses the values of CPn to set the offsets generated by the power offset voltage source 256 in the forward path of the control loop 232 (shown in FIG. 2). The voltage offsets correspond to current offsets that under steady state conditions result in substantially the same power being delivered by each CPE 110.

Figure 5:
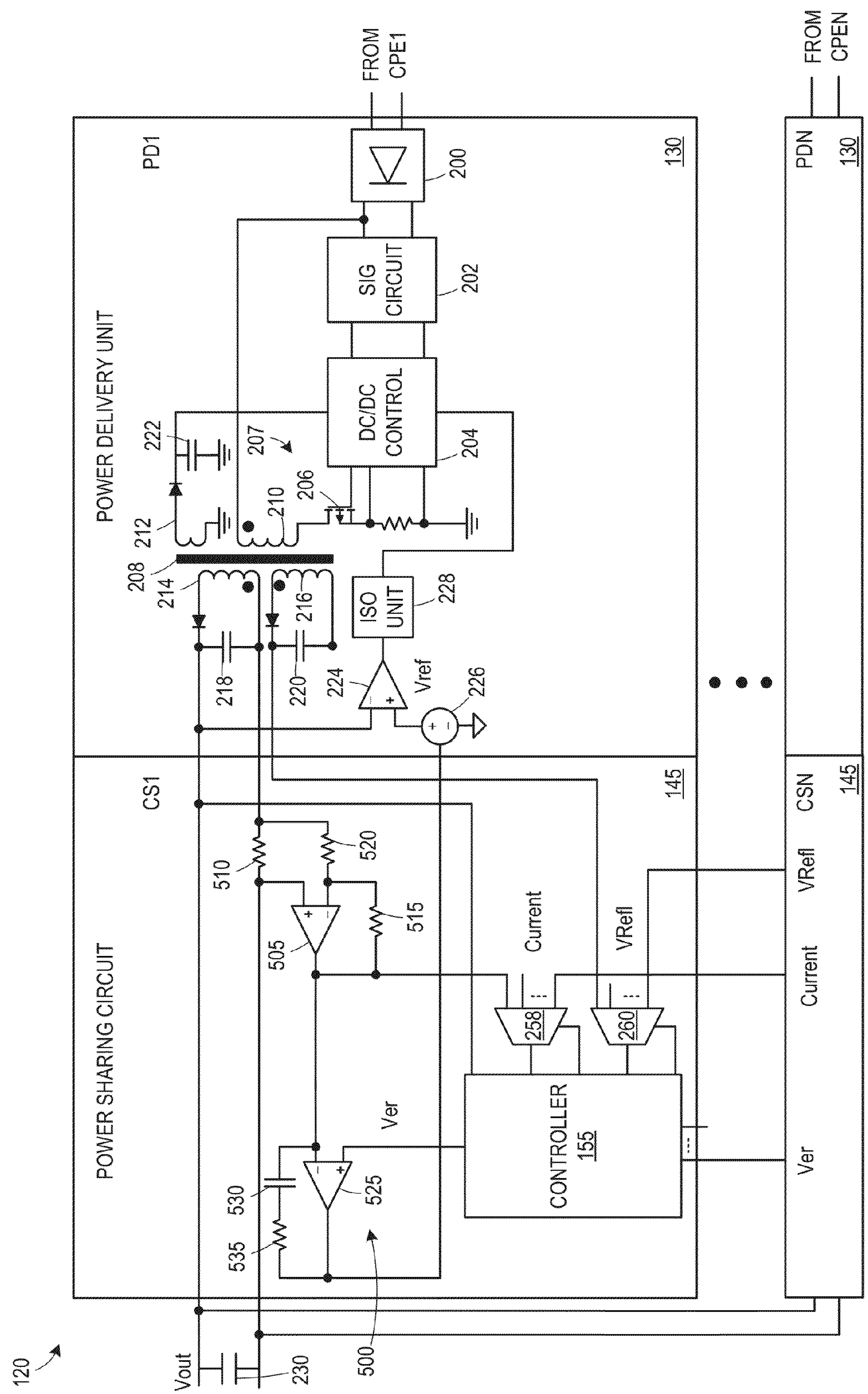
FIG. 5 is a diagram of the power supply illustrating the power sharing circuit and exemplary PD units where the controller directly calculates an error reference voltage in accordance with some embodiments.

FIG. 5 is a diagram of the power supply 120 illustrating the power sharing circuit 145 and exemplary PD units 130 where the controller 155 directly calculates an error reference voltage, Ver, and uses a simplified control loop 500 in accordance with some embodiments. Similar to the embodiment of FIG. 2, a current sensing amplifier 505 in the control loop 500 measures the current using a current sensing resistor 510. The gain of the current sensing amplifier 505 is determined by a ratio of the resistances of resistors 515, 520. The controller 155 directly feeds the value of Ver to a positive terminal of an error amplifier 525 for each of the control loops 500. The error amplifier 525 compares the measured current to the value of Ver provided by the controller 155 and generates an offset to the reference voltage Vref based on the error signal. A series capacitor 530, 535 are present in the feedback path of the error amplifier 525. The current sensing amplifier 505 and the error amplifier 525 define a PI controller that attempts to reduce the error signal to zero.

The controller 155 determines the error reference voltage, Ver, using the equation:

$$Vern = \left[\frac{\sum_{m=1}^{N} Iloadm}{N} + \left(\frac{\left(\frac{1}{N}\cdot\sum_{m=1}^{N} Pclm\right) - Pcln}{Vout}\right)\right].$$

Although the previous examples assume that all of the CPEs 110 are providing power, in some embodiments, only a subset of the PD units 130 may be enabled at a given time. In general, efficiency degrades as the power level decreases for a given power supply. If only a subset of the PD units 130 are enabled, the average power delivered per unit can be increased to increase efficiency. The controller 155 may tally the energy delivered by a given CPE 110, and selectively enable different subsets of the PD units 130 to equalize the power delivered over time.

Figure 6:
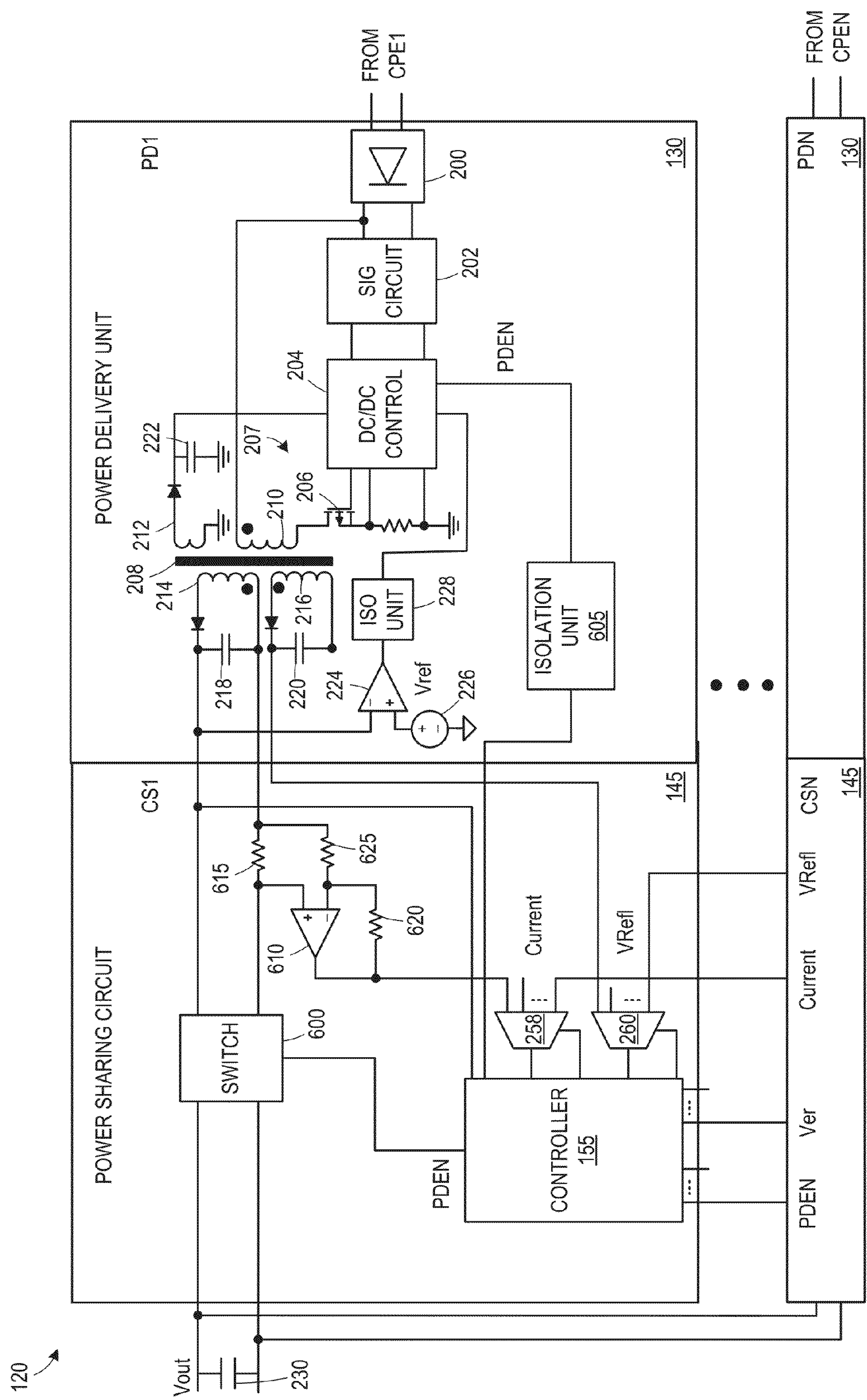
FIG. 6 is a diagram of the power supply illustrating the power sharing circuit and exemplary PD units where the controller employs time sharing to balance power in accordance with some embodiments.

A time sharing approach may also be used to reduce the complexity of the power sharing circuit 145. FIG. 6 is a diagram of the power supply 120 illustrating the power sharing circuit 145 and exemplary PD units 130 where the controller 155 employs time sharing to balance power in accordance with some embodiments. The controller 155 generates a power delivery enable signal, PDEN, for each of the PD units 130. In one embodiment, the PDEN signal controls a switch 600 that isolates the associated PD unit 130 from the output capacitor 230, thereby preventing power from being supplied by the CPE 110. In another embodiment, the controller 155 sends the PDEN signal through a data optical isolation unit 605 to the DC/DC control unit 204 in the PD unit 130 to control whether the PD unit 130 is operating or idle. A current sensing amplifier 610 measures the current using a current sensing resistor 615. The gain of the current sensing amplifier 610 is determined by a ratio of the resistances of resistors 620, 625. The controller estimates the resistance of the attached communication line 115 as described above in reference to FIGS. 2 and 3. The other embodiments described for measuring the resistance may also be employed. Thus, when the PDEN signal is active for the respective power supply 102, power is drawn from the respective CPE 110 connected thereto by respective communication lines 115. When the PDEN signal is inactive for the respective power supply 102, power is not drawn from the respective CPE 110 connected thereto by the respective communication lines 115. The amount of time that the PDEN signal is active for the respective power supply 102, and for which power is then drawn from the respective CPE 110 is denoted as tcpe.

Based on the measured voltage, current and resistance parameters, the controller 155 controls duty cycles of the PD units 130 to balance total energy output by the various CPEs 110 such that over any predetermined time period, T, the product of Icpe*Vcpe*tcpe are equal for all of the CPEs 110. As indicated above, Icpe may be determined in accordance with method step 340 and Vcpe may be either known, or determined under no-load conditions. For example, when the switch 600 is open, the voltage on the primary reflected winding 216 corresponds to Vcpe. In one embodiment, the controller 155 selects the time interval, T, corresponding to the time period the CPEs 110 use to detect disconnects, such as 300 msec. The time interval is divided into N slots, one for each of the active CPEs 110. Of course, an integer multiple of N slots may also be used if smaller active time intervals are desired. To balance the power provided by each CPE 110, the following constraint is met:

$$Vcpe1*Icpe1*tcpe1=Vcpe2*Icpe2*tcpe2=\ldots=Vcpen*Icpen*tcpen$$

If insufficient power is available from a single CPE 110 to run the load attached to Vout a plurality of CPEs 110 may be enabled by the controller 155 to be active simultaneously. The controller 155 thus closes two switches 600 simultaneously and adjusts the respective time intervals for each CPE 110 to ensure that the energy over time is equal for all of the CPEs 110.

Figure 7:
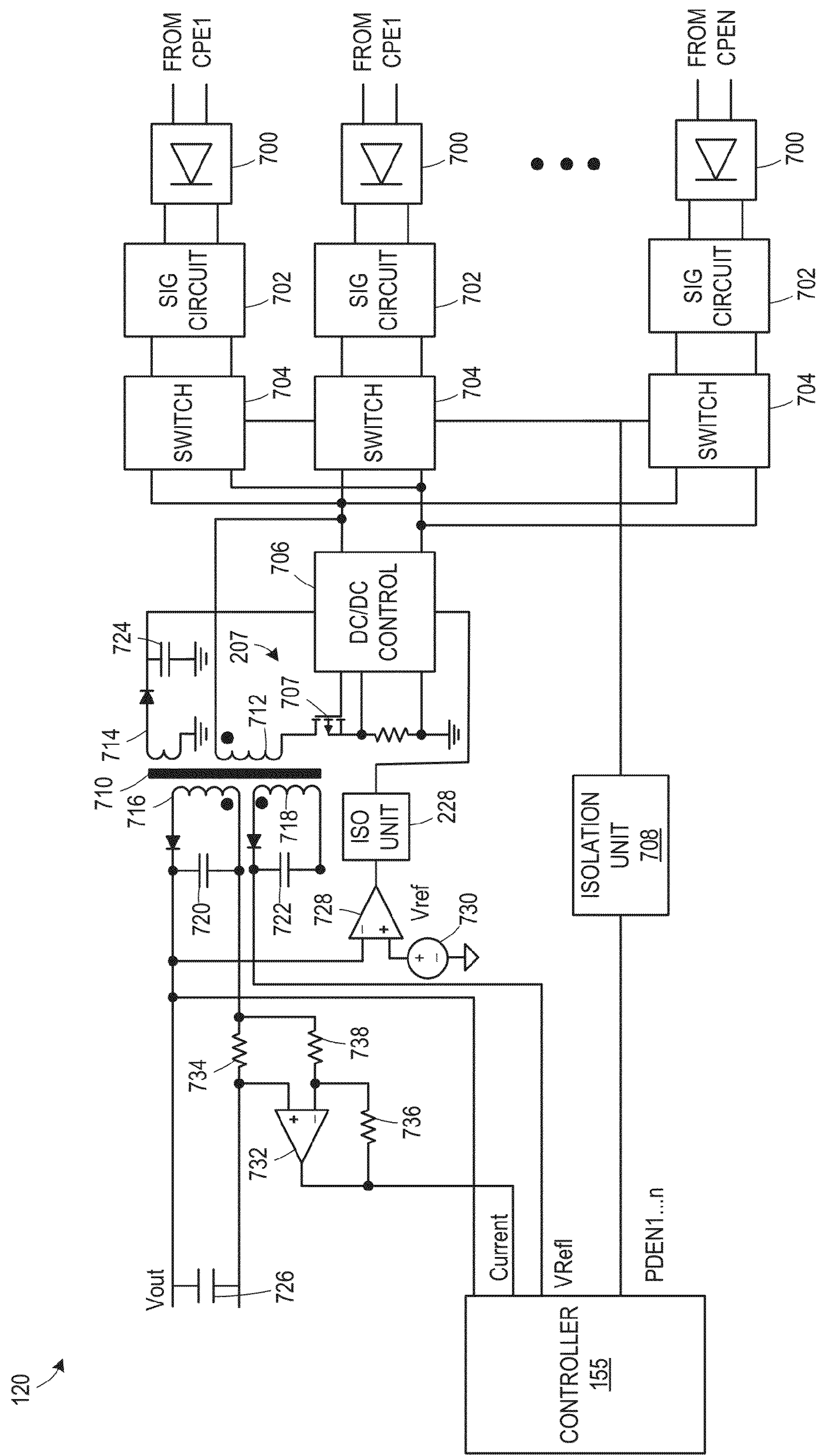
FIG. 7 is a diagram of an alternative embodiment of the power supply of FIG. 6 that employs time sharing using a shared DC/DC control unit and transformer.

FIG. 7 is a diagram of an alternative embodiment of the power supply 120 employing the time sharing embodiment described above. The power supply 120 includes a diode bridge 700, a signature circuit 702, and a switch 704 associated with each CPE 110 (shown in FIG. 1), as described above. The switches 704, collectively acting as a multiplexer, are controlled by the controller 155 to connect the power signal from a selected CPE 110, to the input of a single DC/DC converter 706 with its associated switching transistor 707. The controller 155 outputs a respective PDEN signal, shown as PDEN1 . . . n, through an isolation unit 708 to each of the respective switches 704 to thereby select which CPE 110 actively supplies power to the DC/DC control unit 706 during the respective time period, tcpe. The power supply 120 includes a single transformer 710 including a primary winding 712, a bias winding 714, a load winding 716, and a primary reflected winding 718, and the associated capacitors 720, 722, 724, 726 operating as described above. A comparator 728 compares the output voltage generated by the load winding 716 at the capacitor 720 to a reference voltage source 730, as described above. A current sensing amplifier 732 senses voltage across a current sensing resistor 734 and has a gain determined by the resistances of resistors 736, 738. The power supply 120 may perform any of the calibration techniques described above to determine the resistances of the communication lines 115 (shown in FIG. 1). Based on estimated communication line losses, the controller 155 sets the time interval, tcpe1 . . . n to balance the total power across the CPEs 110. The power supply 120 of FIG. 7 advantageously requires only a single DC/DC control unit 706 and a single transformer 710 for a plurality of CPEs 110.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A power supply unit, comprising:

a plurality of interface ports;

a plurality of power delivery units, each coupled to one of the interface ports and configured to extract power from data signals communicated over the interface ports by remote devices;

a sharing circuit coupled to each of the power delivery units for generating a power supply voltage from the power extracted from the data signals; and a controller configured to generate a communication line power loss estimate for each of the interface ports and configure the power delivery units to balance amounts of power supplied by each of the remote devices based on the communication line power loss estimates.

2. The power supply unit of claim 1, wherein the sharing circuit includes a control circuit configured to generate a reference voltage for each of the power delivery units to control an amount of current supplied by each of the power delivery units based on at least one control parameter, wherein the controller is configured to determine the at least one control parameter for each of the power delivery units based on the communication line power loss estimates.

3. The power supply unit of claim 2, wherein each power delivery unit comprises:

a switching converter circuit coupled to the associated interface port;

a transformer having a primary winding coupled to the switching converter circuit and a secondary winding coupled to the sharing circuit; and an error amplifier coupled to the secondary winding and the control circuit and configured to compare the reference voltage to an output voltage on the secondary winding to generate an error signal based on the comparison.

4. The power supply unit of claim 2, wherein the sharing circuit comprises:

a control loop for each of the power delivery units, each control loop comprising:

a first amplifier configured to generate a first control voltage representing a current supplied by the associated power delivery unit;

an error amplifier configured to compare the first control voltage to a second control voltage representing a highest value of the first control voltage across all of the power delivery units and generate the reference voltage for the associated power delivery unit based on the comparison; and an offset unit controlled by the controller to generate an offset to the first control voltage based on the at least one control parameter.

5. The power supply unit of claim 2, wherein the sharing circuit comprises:

a control loop for each of the power delivery units, each control loop comprising:

a current sensing amplifier configured to generate a first control voltage representing a current supplied by the associated power delivery unit; and an error amplifier configured to compare the first control voltage to the first control parameter and generate the reference voltage for the associated power delivery unit based on the comparison.

6. The power supply unit of claim 1, wherein the controller is configured to generate the communication line power loss estimate for a selected interface port based on an estimated line resistance associated with the selected interface port.

7. The power supply unit of claim 6, wherein the controller is configured to extract a remote device voltage parameter and a remote device current parameter from the data signal and generate the estimated line resistance based on the remote device voltage parameter and the remote device current parameter.

8. The power supply unit of claim 6, wherein each of the power delivery units comprises:

a switching converter circuit; and a transformer coupled to the switching converter circuit, the transformer comprising:

a primary winding coupled to the switching converter circuit;

a load winding coupled to the sharing circuit; and a primary reflected winding configured to generate a first output voltage corresponding to an input voltage of the transformer, wherein the controller is configured to generate the estimated line resistance based on the first output voltage.

9. The power supply unit of claim 8, wherein the controller is configured to determine an output power for a selected power delivery unit, estimate a current of the remote device based on the determined output power, the first output voltage, and an efficiency parameter associated with the transformer, and generate the estimated line resistance based on the estimated current, an output voltage of the remote device, and the first output voltage.

10. The power supply unit of claim 8, wherein the controller is configured to extract a remote device voltage parameter and a remote device current parameter from the data signal and generate the estimated line resistance based on the remote device voltage parameter, the remote device current parameter, and the first output voltage.

11. The power supply unit of claim 6, wherein each of the power delivery units comprises:

a switching converter circuit;

a transformer coupled to the switching converter circuit, the transformer having a primary winding coupled to the switching converter circuit and a load winding coupled to the sharing circuit, a circuit for measuring a primary voltage parameter and a primary current parameter;

a second controller configured to communicate the primary voltage parameter and the primary current parameter to the controller; and an isolation unit coupled between controller and the second controller, wherein the controller is configured to generate the estimated line resistance based on the primary voltage parameter, the primary current parameter, and a remote device voltage parameter.

12. The power supply unit of claim 11, wherein the second controller is configured to measure the primary voltage parameter under a no load condition and the controller is configured to define the remote device voltage based thereon.

13. The power supply unit of claim 6, further comprising:

a current source, wherein the controller is configured to couple the current source to a selected interface port and generate the estimated line resistance.

14. The power supply unit of claim 6, wherein the controller is configured to determine a total power supplied by each of the power delivery units based on power extracted from the data signal for an associated power delivery unit and the communication line power loss estimate for the associated power delivery unit and generate the at least one control parameter for each of the power delivery units to thereby balance the total powers across the plurality of power delivery units.

15. The power supply unit of claim 14, wherein the controller is configured to generate the communication line power loss estimates for each of the power delivery units based on the estimated line resistance and an estimated remote device current.

16. The power supply unit of claim 14, wherein the controller is configured to extract a remote device current parameter from the data signal for each of the power delivery units and generate the communication line power loss estimate for each of the power delivery units based on the estimated line resistance and the remote device current parameter.

17. The power supply unit of claim 14, wherein each of the power delivery units comprises:

a switching converter circuit;

a transformer coupled to the switching converter circuit, the transformer having a primary winding coupled to the switching converter circuit and a load winding coupled to the sharing circuit, a circuit for measuring a primary current parameter;

a second controller configured to communicate the primary current parameter to the controller; and an isolation unit coupled between controller and the second controller, wherein the controller is configured to generate the communication line power loss estimates for each of the power delivery units based on the estimated line resistance and the measured primary current parameter.

18. The power supply unit of claim 1, wherein the controller generates an enable signal for each of the power delivery units and controls the time intervals for asserting each enable signal to balance amounts of power supplied by each of the remote devices based on the communication line power loss estimates.

19. The power supply unit of claim 18, wherein the sharing circuit comprises a plurality of switches controlled by the enable signals to selectively isolate subsets of the power delivery units.

20. A method, comprising:

extracting power from data signals communicated over a plurality of interface ports by remote devices;

generating a power supply voltage from the combined power extracted from the data signals;

generating a communication line power loss estimate for each of the interface ports; and balancing amounts of power supplied by each of the remote devices based on the communication line power loss estimates.

21. The method of claim 20, further comprising generating at least one control parameter for each of a plurality of power delivery units configured to extract the power to control an amount of current supplied by each of the power delivery units based on the communication line power loss estimates.

22. The method of claim 21, wherein extracting power comprises enabling a switching converter circuit coupled to the associated interface port, and generating the at least one control parameter comprises generating a reference voltage for the switching regulator based on the at least one control parameter.

23. The method of claim 22, further comprising:

providing a control loop for generating the reference voltage; and generating an offset in a forward path of the control loop based on the at least one control parameter.

24. The method of claim 20, further comprising:

estimating a line resistance associated with each interface port; and generating the communication line power loss estimates based on an estimated line resistances.

25. The method of claim 24, further comprising:

extracting a remote device voltage parameter and a remote device current parameter from the data signal; and estimating the line resistance based on the remote device voltage parameter and the remote device current parameter.

26. The method of claim 24, wherein extracting power comprises enabling a switching converter circuit coupled to the associated interface port, and the method further comprises:

measuring a first output voltage of a transformer coupled to the switching converter circuit, the transformer comprising:

a primary winding coupled to the switching converter circuit;

a load winding; and a primary reflected winding configured to generate a first output voltage corresponding to an input voltage of the transformer, wherein estimating the line resistance comprises estimating the line resistance based on the first output voltage.

27. The method of claim 26, further comprising:

determining an output power for a selected switching converter circuit;

estimating a current of the remote device based on the determined output power, the first output voltage, and an efficiency parameter associated with the transformer; and estimating the line resistance based on the estimated current, an output voltage of the remote device, and the first output voltage.

28. The method of claim 27, further comprising:

extracting a remote device voltage parameter and a remote device current parameter from the data signal; and estimating the line resistance based on the remote device voltage parameter, the remote device current parameter, and the first output voltage.

29. The power supply unit of claim 24, wherein extracting power comprises enabling a switching converter circuit coupled to the associated interface port, and the method further comprises:

measuring a primary winding voltage parameter and a primary winding current parameter of a transformer coupled to the switching converter circuit, the transformer having a primary winding coupled to the switching converter circuit and a load winding; and estimating the line resistance based on the primary winding voltage parameter, the primary winding current parameter, and a remote device voltage parameter.

30. The method of claim 29, further comprising:

measuring the primary voltage parameter under a no load condition; and defining the remote device voltage based thereon.

31. The method of claim 24, further comprising:

selectively coupling a current source to a selected interface port while estimating the line resistance.

32. The method of claim 24, further comprising:

determining a total power extracted from the remote devices for each of the interface ports based on power extracted from the data signal and the communication line power loss estimate for the associated interface port; and generating the at least one control parameter to thereby balance the total powers across the plurality of interface ports.

33. The method of claim 32, further comprising generating the communication line power loss estimates for each of the power delivery units based on the estimated line resistance and an estimated remote device current.

34. The method of claim 32, further comprising:

extracting a remote device current parameter from the data signal for each of the interface ports; and generating the communication line power loss estimate for each of the interface ports based on the estimated line resistance and the remote device current parameter.

35. The method of claim 32, wherein extracting power comprises enabling a switching converter circuit coupled to the associated interface port, and the method further comprises:

measuring a primary winding current parameter of a transformer coupled to the switching converter circuit, the transformer having a primary winding coupled to the switching converter circuit and a load winding; and generating the communication line power loss estimates for each of the interface ports based on the estimated line resistance and the measured primary winding current parameter.

36. The method of claim 20, further comprising:

selecting subsets of the interface ports from which to extract the power from the data signals over different time intervals; and controlling the subsets and the time intervals to balance amounts of power supplied by each of the remote devices based on the communication line power loss estimates.

37. A power supply unit, comprising:

a plurality of interface ports;

a power delivery unit configured to extract power from a data signal communicated over at least one of the interface ports by remote devices;

logic configured to selectively couple one of the interface ports to the power delivery unit; and a controller configured to generate a communication line power loss estimate for each of the interface ports and control the logic to balance amounts of power supplied by each of the remote devices based on the communication line power loss estimates.

38. The power supply of claim 37, wherein the controller is further configured to control time intervals for controlling the logic to selectively couple one of the interface ports to the power delivery unit to balance amounts of power supplied by each of the remote devices based on the communication line power loss estimates.

* * * * *